US011633654B2

(12) United States Patent
Park

(10) Patent No.: US 11,633,654 B2
(45) Date of Patent: Apr. 25, 2023

(54) PUTTING EXERCISER FOR EVALUATING HITTING SPEED AND TEMPO OF PUTTER

(71) Applicant: DMBH Co., Ltd., Bucheon-si (KR)

(72) Inventor: Yong Gil Park, Seongnam-si (KR)

(73) Assignee: DMBH Co., Ltd., Bucheon-si (KR)

( * ) Notice: Subject to any disclaimer, the term of this patent is extended or adjusted under 35 U.S.C. 154(b) by 233 days.

(21) Appl. No.: 17/167,027

(22) Filed: Feb. 3, 2021

(65) Prior Publication Data

US 2021/0362025 A1    Nov. 25, 2021

(30) Foreign Application Priority Data

May 19, 2020    (KR) ......................... 10-2020-0059978

(51) Int. Cl.
*A63B 69/36* (2006.01)
*A63B 24/00* (2006.01)

(52) U.S. Cl.
CPC ...... *A63B 69/3614* (2013.01); *A63B 24/0062* (2013.01); *A63B 69/3661* (2013.01);
(Continued)

(58) Field of Classification Search
CPC ............ A63B 69/3614; A63B 24/0062; A63B 69/3661; A63B 2024/0028; A63B 2220/30; A63B 2220/62; A63B 2220/805; A63B 2225/74; A63B 67/02; A63B 69/3658; A63B 69/3676; A63B 2102/32; A63B 2220/10; A63B 2220/17; G01P 3/50; G01P 3/36; G01P 11/00; G01S 7/4911; G01S 7/4913
(Continued)

(56) References Cited

U.S. PATENT DOCUMENTS 6,540,620 B1    4/2003 Consiglio
6,579,190 B2 *  6/2003 Yamamoto ......... A63B 24/0021
                                              473/405
(Continued)

FOREIGN PATENT DOCUMENTS

KR    10-1996-0010036 A    4/1996
KR    10-2005-0042106 A    5/2005
(Continued)

OTHER PUBLICATIONS

Office Action of Korean Patent Application No. 10-2020-0059978 dated Aug. 8, 2021.
(Continued)

*Primary Examiner* — Nini F Legesse
(74) *Attorney, Agent, or Firm* — Revolution IP, PLLC

(57) ABSTRACT

An exerciser includes: sensor installation units provided to be spaced apart from and face each other in a direction parallel; a radiation unit for radiating light, in a first sensor installation unit; a light receiving unit for receiving the light radiated from the radiation unit, in a second sensor installation unit; a speed detection unit for detecting a speed of the golf ball by checking a moment the golf ball passes; a position measurement unit for measuring a position of the golf ball; an operation control unit for performing calculation to detect an initial position value of the golf ball and a moving speed Vb and a moving distance Hb of the golf ball; and a storage unit for storing the measured speed Vb and distance Hb of the golf ball.

3 Claims, 5 Drawing Sheets

(52) U.S. Cl.
CPC ... *A63B 2024/0028* (2013.01); *A63B 2220/30* (2013.01); *A63B 2220/62* (2013.01); *A63B 2220/805* (2013.01); *A63B 2225/74* (2020.08)

(58) Field of Classification Search
USPC ....... 473/140, 141, 156, 219–225, 233, 257, 473/405, 406, 407, 199
See application file for complete search history.

(56) References Cited

U.S. PATENT DOCUMENTS

| | | | | |
|---|---|---|---|---|
| 8,052,540 | B2* | 11/2011 | Loh | A63B 69/36211 473/226 |
| 2002/0022530 | A1* | 2/2002 | Yoon | A63B 69/36211 473/150 |
| 2005/0197198 | A1* | 9/2005 | Otten | A63B 69/3614 473/221 |
| 2005/0215336 | A1* | 9/2005 | Ueda | A63B 69/3614 473/131 |
| 2006/0014589 | A1* | 1/2006 | Kim | A63B 69/3614 473/233 |
| 2007/0224583 | A1* | 9/2007 | Humphrey | A63B 71/06 434/252 |
| 2008/0009359 | A1* | 1/2008 | Yun | A63B 69/3676 473/152 |

FOREIGN PATENT DOCUMENTS

| | | |
|---|---|---|
| KR | 10-0871675 B1 | 12/2008 |
| KR | 10-2010-0133087 A | 12/2010 |
| KR | 10-1282048 B1 | 7/2013 |
| KR | 10-1388400 B1 | 5/2014 |
| KR | 10-1599408 B1 | 3/2016 |

OTHER PUBLICATIONS

Office Action of Korean Patent Application No. 10-2020-0059978 dated Apr. 29, 2022.

* cited by examiner

# PUTTING EXERCISER FOR EVALUATING HITTING SPEED AND TEMPO OF PUTTER

BACKGROUND OF THE INVENTION

Field of the Invention

The present invention relates to a putting exerciser for evaluating a hitting speed and a tempo of a putter, and more particularly, to a putting exerciser which can measure and provide the speed, direction, and moving distance of a golf ball, and the speed and tempo of a putter to a user when putting.

Background of the Related Art

Golf is a game competing to hit a golf ball with a club and put the golf ball into a hole cup at a specified distance with the smallest number of strokes, and the hitting technique of golf is divided into driver and iron shots off the green and putts on the green.

In particular, since putting is a technique most important in maintaining a low score in golf, the portion occupied by the putting in golf is very large, and various training devices for improving putting skills are researched and developed.

Korean Patent Registration No. 10-1282048 discloses a method of calculating a putting distance based on a speed and a direction angle of a golf ball using an optical sensor, under the title of "Golf putting trainer and method for the same".

In addition, Korea Patent Registration No. 10-1388400 discloses a method and device for sensing a starting point of a golf ball, measuring a starting speed and a direction angle of the golf ball when putting, and calculating a putting distance using the measured values, under the title of "Putting device compensation function, with starting point".

That is, the conventional putting exercisers as described above are provided as a system for measuring the speed and direction of a golf ball when putting using a sensor and providing a user with only a moving distance and direction of the golf ball.

However, many factors such as the speed and face angle of a putter head and the length, moving path, and tempo of a putter are applied as factors for determining the moving distance and direction of a golf ball when putting.

Therefore, the conventional putting exercisers that measure only the speed and direction of a golf ball make it difficult for a user to obtain objective information about his or her putting, and control of a hitting force for successful putting should be learned by feeling through repetitive training.

SUMMARY OF THE INVENTION

Therefore, the present invention has been made in view of the above problems, and it is an object of the present invention to provide a putting exerciser for evaluating a hitting speed and a tempo of a putter, which measures a tempo, which is a time interval from the starting point of backswing of the putter to the impact after downswing, and providing a user with measured data.

In addition, another object of the present invention is to provide a putting exerciser for evaluating a hitting speed and a tempo of a putter, which is helpful for putting practice by measuring the speed and direction of a golf ball when putting, and providing information (tempo, accurate hitting, etc.) about user's putting through the relations among the measured values.

However, the objects of the present invention are not limited to the objects described above, and unmentioned other objects will be clearly understood by those skilled in the art from the following descriptions.

To accomplish the above objects, according to one aspect of the present invention, there is provided a putting exerciser for evaluating a hitting speed and a tempo of a putter, the exerciser comprising: sensor installation units provided to be spaced apart from and face each other in a direction parallel to a traveling direction of a golf ball 1; a radiation unit 100 for radiating light or a light receiving unit 200 in a first sensor installation unit, i.e., one of the sensor installation units; a light receiving unit 200 or a radiation unit 100 in a second sensor installation unit, i.e., the other one of the sensor installation units; a speed detection unit 300 for detecting a speed of the golf ball 1 by checking a moment the golf ball passes when the golf ball 1 is putted as the light radiated from the radiation unit 100 is received by the light receiving unit 200; a position measurement unit 400 for measuring a position of the golf ball 1; an operation control unit 500 for performing calculation to detect an initial position value of the golf ball 1 measured by the position measurement unit 400 and a moving speed Vb and a moving distance Hb of the golf ball 1 measured through the speed detection unit 300; and a storage unit 600 for storing the measured speed Vb and distance Hb of the golf ball 1.

In addition, the radiation unit 100 includes: a first radiation unit 110 for radiating light to detect the initial position of the golf ball 1; a second radiation unit 120 for radiating light to detect the speed of the golf ball 1; and a third radiation unit 130 for radiating light to detect the hitting speed and tempo of the putter 2 moving behind the golf ball 1 to hit the golf ball 1.

In addition, the light receiving unit 200 includes: a first light receiving unit 210 installed to face the first radiation unit 110 to receive the light radiated from the first radiation unit 110; a second light receiving unit 220 installed to face the second radiation unit 120 to receive the light radiated from the second radiation unit 120; and a third light receiving unit 230 installed to face the third radiation unit 130 to receive the light radiated from the third radiation unit 130.

In addition, the third radiation unit 130 includes: a 31st radiation unit 131 installed to be close to the first radiation unit 110; and a 32nd radiation unit 132 installed at a location spaced apart from the 31st radiation unit 131 by a predetermined distance Dc.

In addition, the third light receiving unit 230 includes: a 31st light receiving unit 231 installed to correspond to the 31st radiation unit 131; and a 32th light receiving unit 232 installed to correspond to the 32nd radiation unit 132.

In addition, there is provided a putting exerciser for evaluating a hitting speed and a tempo of a putter, in which when the time detected through the 31st radiation unit 131 and the 31st light receiving unit 231 after the putter 2 starts backswing is t0, and the time detected again through the 31st radiation unit 131 and the 31st light receiving unit 231 after the putter 2 is switched from backswing to downswing and moves forward is t1, the tempo T is defined as $T=t1-t0$.

In addition, there is provided a putting exerciser for evaluating a hitting speed and a tempo of a putter, in which when the time detected through the 32nd radiation unit 132 and the 32nd light receiving unit 232 after the putter 2 is switched to downswing and moves forward is t2, and the distance between the 31st radiation unit 131 and the 32nd radiation unit 132 is Dc, the speed Vp of the putter 2 is defined as Vp=Dc/(t1−t2).

In addition, the tempo T measured by the backswing and downswing of the putter 2 and the speed Vp of the putter are stored in the storage unit 600, and after the putter 2 hits the golf ball 1, the moving speed Vb and the moving distance Hb of the golf ball 1 are calculated through the operation control unit 500 and then stored in the storage unit 600.

In addition, after putting i times (i=1, 2, 3, ..., n−1, n) with the putter 2, a tempo Ti value measured each time is stored in the storage unit 600, and the operation control unit 500 calculates a standard deviation Tsd and an average Tav of the tempo Ti measured each time, and stores the calculated standard deviation Tsd and average Tav in the storage unit 600.

In addition, there is provided a putting exerciser for evaluating a hitting speed and a tempo of a putter, in which when the standard deviation Tsd and the average Tav are measured j times (j=1, 2, 3, ..., m−1, m), and the average value of the standard deviation Tsd measured j times is a standard deviation reference value Tsd_b, and the average value of the average value Tav measured j times is an average reference value Tav_b, the standard deviation reference value Tsd_b is Tsd_b=[(Tsd_1+Tsd_2+Tsd_3+ ... +Tsd_m−1+Tsd_m)/m], and the average reference value Tav_b is Tav_b=[(Tav_1+Tav_2+Tav_3+ ... +Tav_m−1+Tav_m)/m].

In addition, when the standard deviation value is Tsd_0 and the average value is Tav_0 for the tempo Ti_now currently measured by a number of current putting practices, if the standard deviation value Tsd_0 of the currently measured tempo Ti_now is smaller than the standard deviation reference value Tsd_b (Tsd_0<Tsd_b), it is determined as 'tempo improved'. In addition, if the standard deviation value Tsd_0 is equal to the standard deviation reference value Tsd_b (Tsd_0=Tsd_b), it is determined as 'tempo normal'. In addition, if the standard deviation value Tsd_0 is greater than the standard deviation reference value Tsd_b (Tsd_0>Tsd_b), it is determined as 'tempo bad'.

In addition, when a value obtained by dividing the absolute value of a difference value between the average value Tav_0 of the currently measured tempo Ti_now and the average reference value Tav_b by the average reference value Tav_b is smaller than 0.1 (|Tav_0−Tav_b|/Tav_b⇐0.1) in a state determined as 'tempo improved' (Tsd_0<Tsd_b), it is determined as 'tempo much improved'.

On the other hand, when the speed value of the putter 2 measured each time after putting i times (i=1, 2, 3, ..., n−1, n) with the putter 2 is Vpi, and the speed of the golf ball 1 hit by the putter 2 and moving at this time is Vbi, if speed values Vpi having the same speed among the Vpi (here, i=1, 2, 3, ..., n−1, n) are grouped and divided by the speed, each speed is Vp_q (here, q=1, 2, 3, ..., k−1, k, k+1, ..., u−1, u), and when the speed of the putter 2 is Vp_k, the highest speed among the speeds of the golf ball 1 is referred to as Vb_k_max. In addition, when the speed of the putter 2 is Vp_q, the highest speed among the speeds of the golf ball 1 moved by hitting of the putter 2 is defined as Vb_q_max, and Vp_q and Vb_q_max are stored in the storage unit 600.

At this point, subscript p (e.g., Vp) means a putter, and subscript b (e.g., Vb) means a golf ball.

In addition, when the current speed of the putter 2 measured by the current putter practice is Vpc, and the speed of the golf ball 1 hit and moving forward is Vbc, a speed the same as Vpc is found from the speeds Vp_q. At this point, when Vpc=Vp_k, the speed constant is Vconst=(Vbc)/(Vb_k_max), and when the speed constant is Vconst≥1, it is determined as 'hitting point very accurate'.

In addition, when the speed constant is 0.95<Vconst≤1, it is determined as "hitting point improved", when the speed constant is 0.9<Vconst≤0.95, it is determined as "hitting point normal", when the speed constant is 0.85<Vconst≤0.9, it is determined as "hitting point effort required", when the speed constant is 0.8<Vconst≤0.85, it is determined as "hitting point bad", and when the speed constant is Vconst≤0.8, it is determined as "hitting point correction required", and at this point, it is natural that the sections of Vconst and the terms expressing the determinations may be appropriately modified and displayed.

In addition, as it is natural that the speed and tempo of the putter are changed as the weight or shape of the putter are changed when the putter used is changed as needed, the speed of the golf ball will be changed.

At this point, a user may select a putter that fits his or her body shape by pressing an initiation button to collect data again in a minimum start mode or separately specify data according to a putter type, and comparing the results such as the tempo, the speed constant and the like according to the putter.

The features and advantages of the present invention will become more apparent from the following detailed descriptions based on the accompanying drawings.

Prior to this, the terms or words used in the specification and claims should not be interpreted in a conventional and dictionary meaning, and should be interpreted as a meaning and concept meeting the spirit of the present invention based on the principle that inventors may appropriately define the concept of the terms to describe their own invention in the best way.

Figure 1:
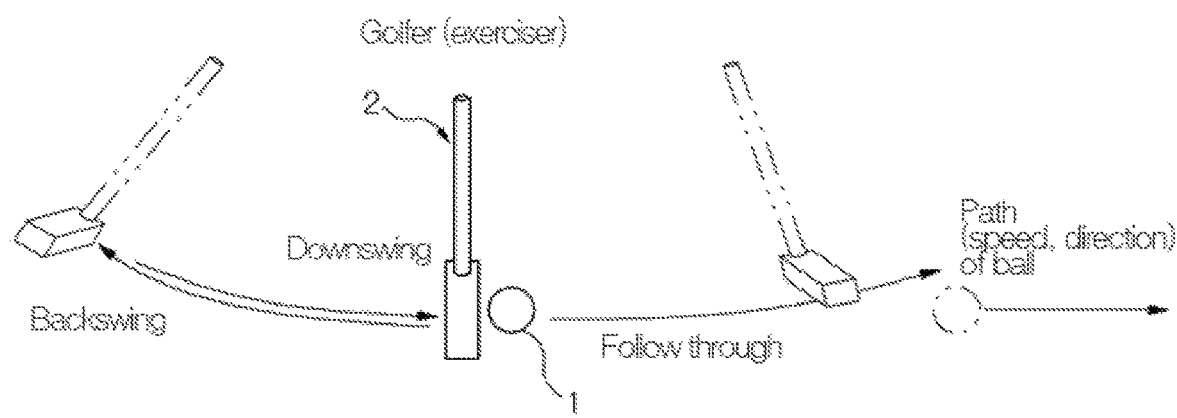
FIG. 1 is a view schematically showing a putting process.

| DESCRIPTION OF SYMBOLS | |
| --- | --- |
| 1: Golf ball | 2: Putter |
| 10: Putting exerciser | 100: Radiation unit |
| 110: First radiation unit | 120: Second radiation unit |
| 130: Third radiation unit | 131: 31st radiation unit |
| 132: 32nd radiation unit | 200: Light receiving unit |
| 210: First light receiving unit | 220: Second light receiving unit |
| 230: Third light receiving unit | 231: 31st light receiving unit |
| 232: 32nd light receiving unit | 300: Speed detection unit |
| 400: Position measurement unit | 500: Operation control unit |
| 600: Storage unit | |

DETAILED DESCRIPTION OF THE PREFERRED EMBODIMENT

Hereinafter, preferred embodiments of the present invention will be described with reference to the accompanying drawings. In this process, thicknesses of lines or sizes of components shown in the drawings may be exaggerated for clarity and convenience of description.

In addition, the terms described below are terms defined considering the functions in the present invention, and they may vary according to user or operator's intention or custom. Therefore, definitions of these terms should be made based on the contents throughout the specification.

In addition, the following examples are not intended to limit the scope of the present invention, but are intended to merely illustrate the components presented in the claims of the present invention, and the embodiments included in the spirit throughout the specification of the present invention and including the components that can be substituted as equivalents in the components of the claims may be included in the scope of the present invention.

Figure 2:
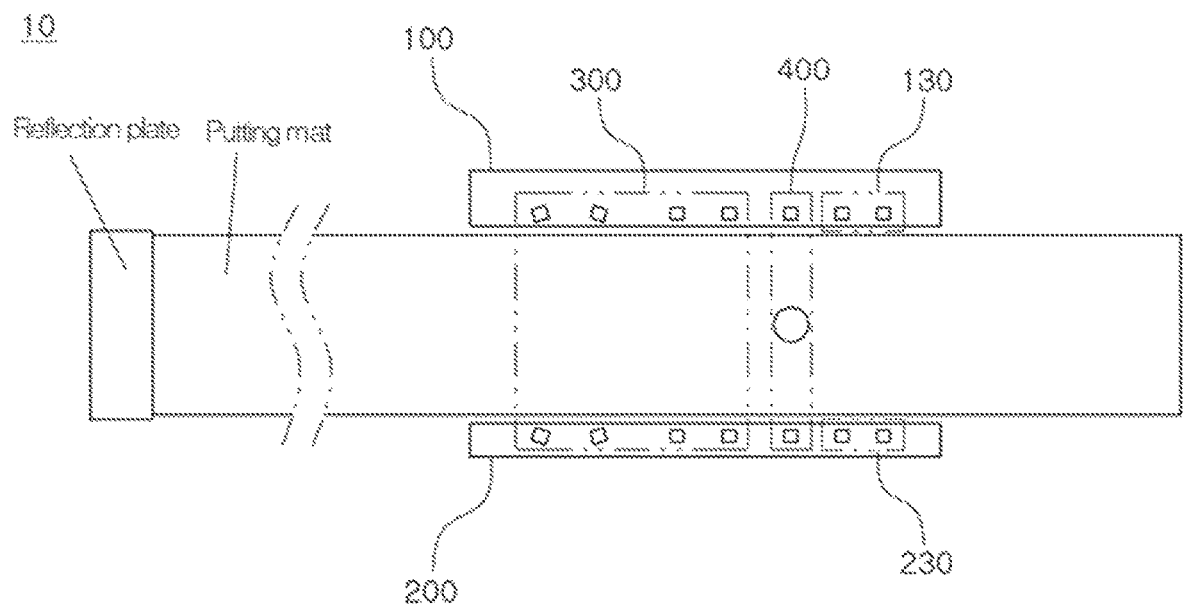
FIG. 2 is a plan view schematically showing a putting exerciser according to a preferred embodiment of the present invention.
Figure 3:
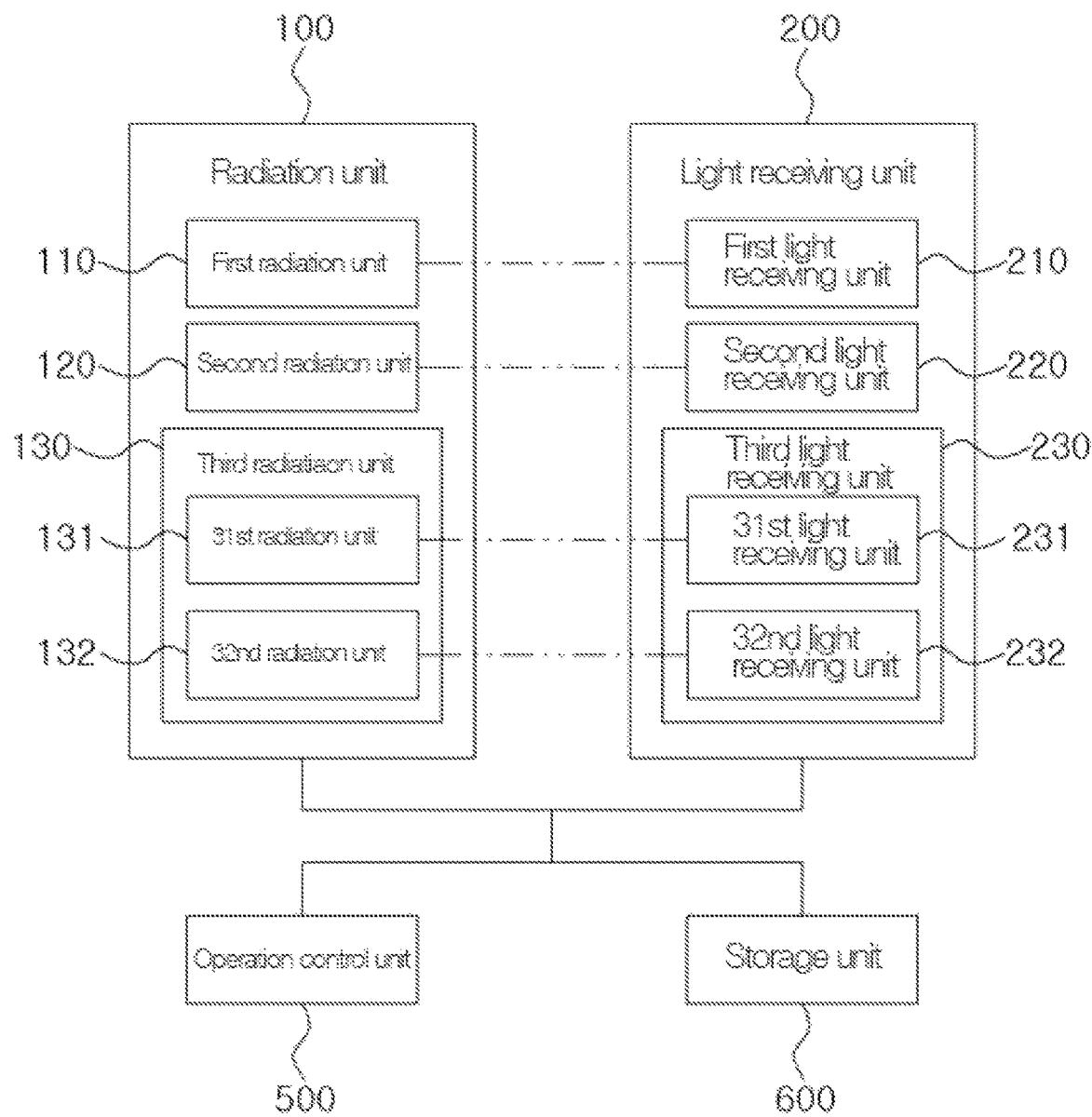
FIG. 3 is a block diagram schematically showing the configuration of a putting exerciser according to a preferred embodiment of the present invention.
Figure 4:
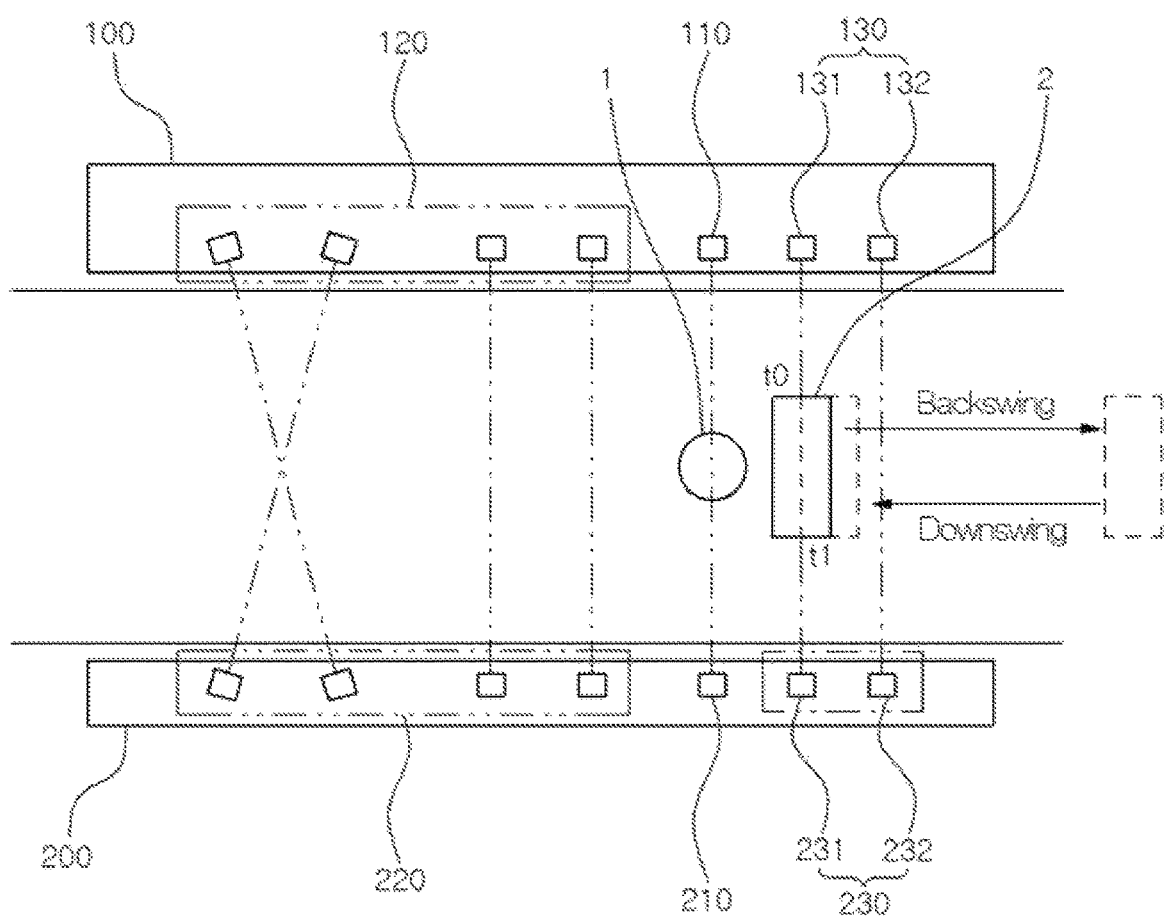
FIG. 4 is a view schematically showing the principle of a method of measuring a tempo according to a preferred embodiment of the present invention.
Figure 5:
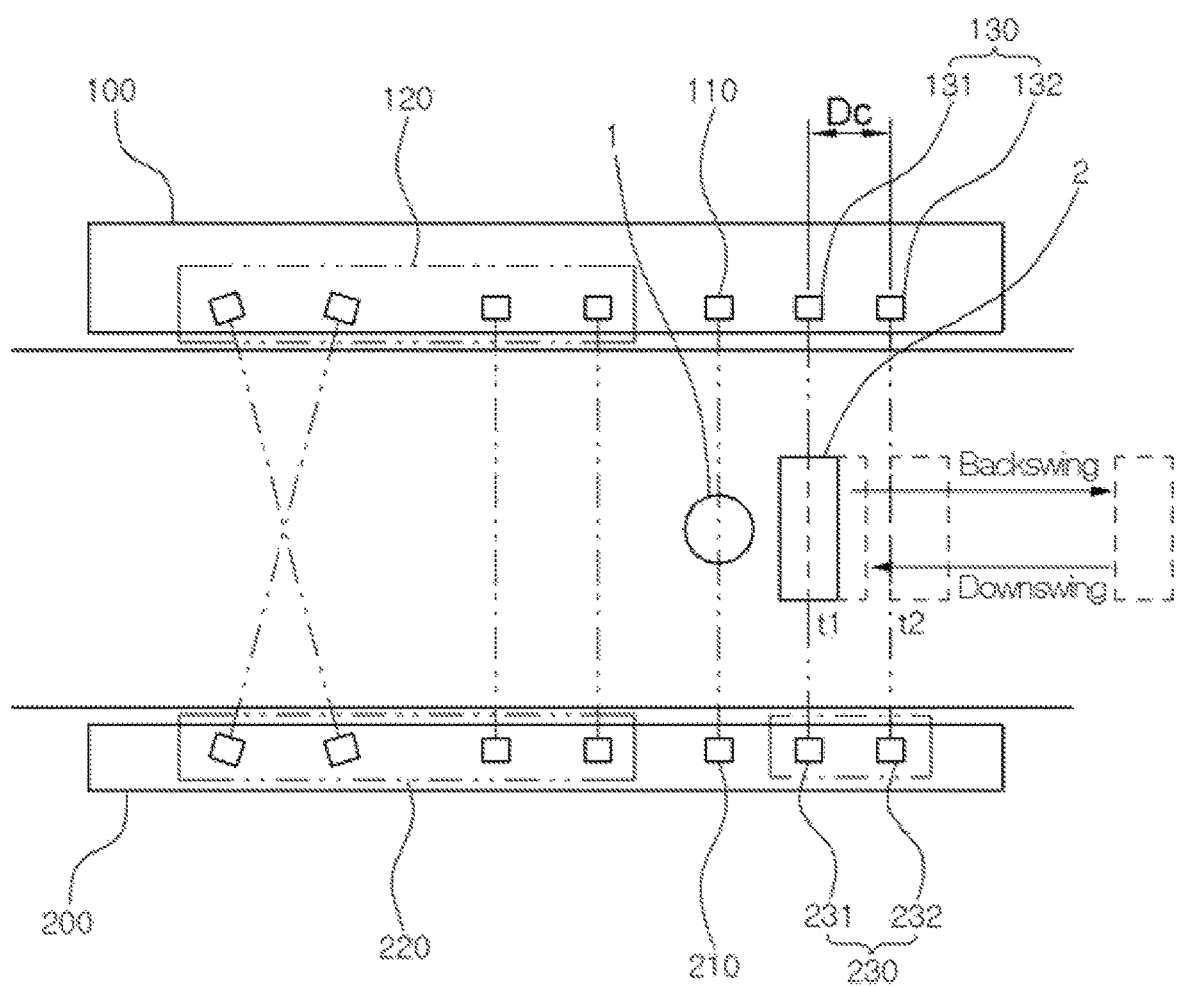
FIG. 5 is a view schematically showing the principle of a method of measuring a club speed according to a preferred embodiment of the present invention.
Figure 6:
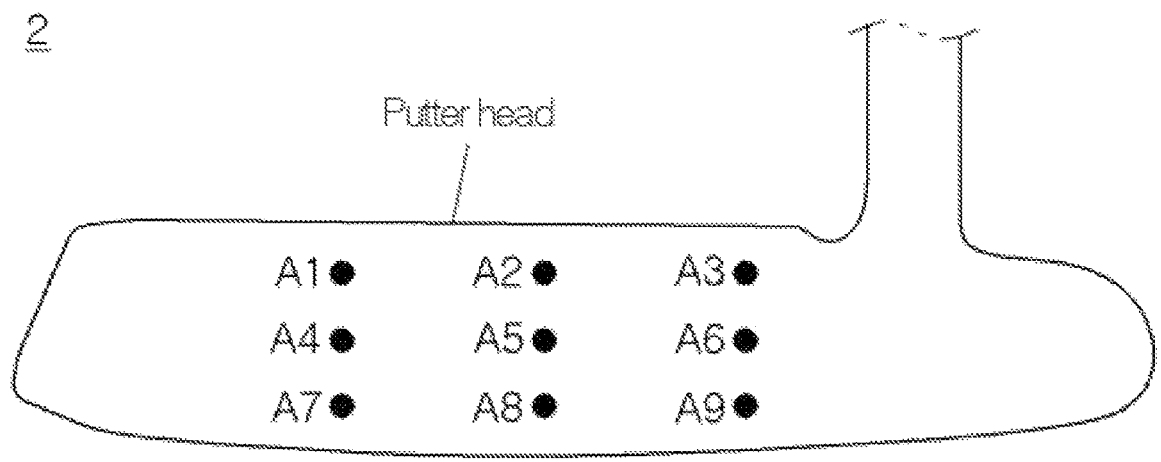
FIG. 6 is a front view schematically showing a general putter head.

FIG. 1 is a view schematically showing a putting process, FIG. 2 is a plan view schematically showing a putting exerciser according to a preferred embodiment of the present invention, FIG. 3 is a block diagram schematically showing the configuration of a putting exerciser according to a preferred embodiment of the present invention, FIG. 4 is a view schematically showing the principle of a method of measuring a tempo according to a preferred embodiment of the present invention, FIG. 5 is a view schematically showing the principle of a method of measuring a club speed according to a preferred embodiment of the present invention, and FIG. 6 is a front view schematically showing a general putter head.

As shown in FIG. 1 and below, a putting exerciser 10 according to the present invention includes sensor installation units provided to be spaced apart from and face each other in a direction parallel to the traveling direction of a golf ball 1.

In addition, the putting exerciser 10 includes a radiation unit 100 for radiating light, in a first sensor installation unit, i.e., one of the sensor installation units, a light receiving unit 200 for receiving the light radiated from the radiation unit 100, in a second sensor installation unit, i.e., the other one of the sensor installation units, a speed detection unit 300 for detecting the speed of the golf ball 1 when the golf ball 1 is putted as the light radiated from the radiation unit 100 is received by the light receiving unit 200, and a position measurement unit 400 for measuring the position of the golf ball 1.

In addition, the putting exerciser 10 includes an operation control unit 500 for performing calculation to detect the initial position value of the golf ball 1 measured by the position measurement unit 400 and the moving speed Vb and the moving distance Hb of the golf ball 1 measured through the speed detection unit 300, and a storage unit 600 for storing the measured speed Vb and distance Hb of the golf ball 1.

In addition, the radiation unit 100 includes a first radiation unit 110 for radiating light to detect the initial position of the golf ball 1, a second radiation unit 120 for radiating light to detect the speed of the golf ball 1, and a third radiation unit 130 for radiating light to detect the hitting speed and tempo of the putter 2 moving behind the golf ball 1 to hit the golf ball 1.

In addition, the light receiving unit 200 includes a first light receiving unit 210 installed to face the first radiation unit 110 to receive the light radiated from the first radiation unit 110, a second light receiving unit 220 installed to face the second radiation unit 120 to receive the light radiated from the second radiation unit 120, and a third light receiving unit 230 installed to face the third radiation unit 130 to receive the light radiated from the third radiation unit 130.

In addition, the second radiation unit 120 and the second light receiving unit 220 are used to measure the speed and direction of the golf ball immediately after putting, and since these spirits are already described in the prior art, detailed descriptions thereof will be omitted.

In addition, the third radiation unit 130 includes a 31st radiation unit 131 installed to be close to the first radiation unit 110, and a 32nd radiation unit 132 installed at a location spaced apart from the 31st radiation unit 131 by a predetermined distance Dc.

In addition, the third light receiving unit 230 includes a 31st light receiving unit 231 installed to correspond to the 31st radiation unit 131, and a 32th light receiving unit 232 installed to correspond to the 32nd radiation unit 132.

In addition, when the time detected through the 31st radiation unit 131 and the 31st light receiving unit 231 after the putter 2 starts backswing is t0, and the time detected again through the 31st radiation unit 131 and the 31st light receiving unit 231 after the putter 2 is switched from backswing to downswing and moves forward is t1, the tempo T is defined as T=t1−t0.

In addition, when the time detected through the 32nd radiation unit 132 and the 32nd light receiving unit 232 after the putter 2 is switched to downswing and moves forward is t2, and the distance between the 31st radiation unit 131 and the 32nd radiation unit 132 is Dc, the speed Vp of the putter 2 is defined as Vp=Dc/(t1−t2).

The tempo T and the speed Vp are important factors that affect the putting distance (the moving distance of the golf ball), and although the tempo is maintained to be consistent, the speed Vp changes according to the putting distance.

That is, the rotation speed of the putter should be adjusted according to the putting distance by increasing or decreasing the distance of backswing while constantly maintaining the tempo to accurately control the force and accurately send the golf ball as much as a desired distance.

Therefore, it is very important to practice to be accustomed to a consistent putting tempo and the speed Vp of the putter according to a putting distance, and this is essential for improving the putting technique.

Hereinafter, a method of providing information on a user's tempo will be described in detail.

The tempo T measured by the backswing and downswing of the putter 2 and the speed Vp of the putter are stored in the storage unit 600, and after the putter 2 hits the golf ball 1, the moving speed Vb and the moving distance Hb of the golf ball 1 are calculated through the operation control unit 500 and then stored in the storage unit 600.

In addition, after putting i times (i=1, 2, 3, . . . , n−1, n) with the putter 2, the tempo Ti value measured each time is stored in the storage unit 600. Then, the operation control unit 500 calculates a standard deviation Tsd and an average Tav of the tempo Ti measured each time, and stores the calculated standard deviation Tsd and average Tav in the storage unit 600.

The average Tav of the tempo Ti is defined as (T1+T2+ . . . +Tn)/n, and the standard deviation Tsd of the tempo Ti is defined as $$T_{sd} = \sqrt{\frac{\overset{n}{\underset{i=1}{Q}}(T_i - T_{av})^2}{n}}.$$

In addition, when the standard deviation Tsd and the average Tav are measured j times (j=1, 2, 3, . . . , m−1, m), and the average value of the standard deviation Tsd measured j times is a standard deviation reference value Tsd_b, and the average value of the average value Tav measured j times is an average reference value Tav_b, the standard deviation reference value Tsd_b may be defined and calculated as Tsd_b=[(Tsd_1+Tsd_2+Tsd_3+ . . . +Tsd_m−1+Tsd_m)/m], and the average reference value Tav_b may be defined and calculated as Tav_b=[(Tav_1+Tav_2+Tav_3+ . . . +Tav_m−1+Tav_m)/m].

In addition, the standard deviation reference value Tsd_b and the average reference value Tav_b are stored in the storage unit 600.

In addition, when the standard deviation value is Tsd_0 and the average value is Tav_0 for the tempo Ti_now currently measured by a number of current putting practices, if the standard deviation value Tsd_0 of the currently measured tempo Ti_now is smaller than the standard deviation reference value Tsd_b (Tsd_0<Tsd_b), it is determined as 'tempo improved'.

In addition, if the standard deviation value Tsd_0 is equal to the standard deviation reference value Tsd_b (Tsd_0=Tsd_b), it is determined as 'tempo normal'.

In addition, if the standard deviation value Tsd_0 is greater than the standard deviation reference value Tsd_b (Tsd_0>Tsd_b), it is determined as 'tempo bad'.

In addition, when a value obtained by dividing the absolute value of a difference value between the average value Tav_0 of the currently measured tempo Ti_now and the average reference value Tav_b by the average reference value Tav_b is smaller than 0.1 (|Tav_0-Tav_b|/Tav_b⇐0.1) in a state determined as 'tempo improved' (Tsd_0<Tsd_b), it is determined as 'tempo much improved'.

In other words, after putting i times (i=1, 2, 3, . . . , n−1, n) with the putter 2, the standard deviation Tsd and the average Tav of the tempo Ti value measured each time are calculated.

Then, the standard deviation Tsd and the mean Tav are measured j times (j=1, 2, 3, . . . , m−1, m), and the standard deviation reference value Tsd_b and the average reference value Tav_b of the standard deviation Tsd and the mean Tav measured j times are calculated.

Then, the standard deviation value Tsd_0 and the average value Tav_0 of the tempo Ti_now measured by a number of current putting practices are calculated, and the standard deviation value Tsd_0 and the standard deviation reference value Tsd_b are compared.

That is, consistency of the current putting tempo is measured, determined, and provided to the user by comparing the data measured by the current putting practice with previously stored data.

Meanwhile, hereinafter, a method of providing information on the hitting point of the putter to the user will be described in detail.

When the speed value of the putter 2 measured each time after putting i times (i=1, 2, 3, . . . , n−1, n) with the putter 2 is Vpi, and the speed of the golf ball 1 hit by the putter 2 and moving at this time is Vbi, if speed values Vpi having the same speed among the Vpi (here, i=1, 2, 3, . . . , n−1, n) are grouped and divided by the speed, each speed is Vp_q (here, q=1, 2, 3, . . . , k−1, k, k+1, . . . , u−1, u), and when the speed of the putter 2 is Vp_k, the highest speed among the speeds of the golf ball 1 is referred to as Vb_k_max.

In other words, the speed value of the putter 2 measured each time after putting i times (i=1, 2, 3, . . . , n−1, n) with the putter 2 is Vpi, and the speed of the golf ball 1 is Vbi.

Then, the speed values Vpi having the same speed among the Vpi (here, i=1, 2, 3, . . . , n−1, n) are grouped and divided by the speed Vbi of the golf ball.

That is, after putting 100 times with the putter 2, the speed value of the putter 2 and the speed value of the golf ball 1 corresponding to each putting are measured, and at this time, the same speed values among the speed values of the putter 2 may be grouped and divided by the speed value of the golf ball within the groups.

That is, although the speed values of the putter 2 are the same, the speed values of the golf ball 1 corresponding thereto may be different. This is since that the center portion A5 of the putter head is a spot point, and the speed of the golf ball is the highest when the golf ball is hit by the center portion A5 of the putter, and as the hitting point is farther away from the center of the putter 2, the speed of the golf ball decreases, and therefore, the moving distance of the golf ball also decreases.

In addition, when the speed of the putter 2 is Vp_q, the highest speed among the speeds of the golf ball 1 moved by hitting of the putter 2 is defined as Vb_q_max, and Vp_q and Vb_q_max (here, q=1, 2, 3, . . . , k−1, k, k+1, . . . , u−1, u) are stored in the storage unit 600.

In addition, when the current speed of the putter 2 measured by the current putter practice is Vpc, and the speed of the golf ball 1 hit and moving forward is Vbc, a speed the same as Vpc is found from the speeds Vp_q (here, q=1, 2, 3, . . . , k−1, k, k+1, . . . , u−1, u). At this point, when Vpc=Vp_k, the speed constant is Vconst=(Vbc)/(Vb_k_max), and when the speed constant is Vconst 1, it is determined as 'hitting point very accurate'.

In addition, when the speed constant is 0.95<Vconst≤1, it is determined as "hitting point improved", when the speed constant is 0.9<Vconst≤0.95, it is determined as "hitting point normal", when the speed constant is 0.85<Vconst≤0.9, it is determined as "hitting point effort required", when the speed constant is 0.8<Vconst≤0.85, it is determined as "hitting point bad", and when the speed constant is Vconst≤0.8, it is determined as "hitting point correction required".

It is natural that the sections of Vconst and the terms expressing the determinations may be appropriately modified and displayed.

That is, the putting exerciser 10 according to the present invention may improve the effect of practice of a user by measuring the tempo, which is a time interval between the time point of passing the initial starting point of backswing of the putter 2 and the time point of passing through the initial starting point after downswing, using an optical sensor, and providing data on the consistency of the tempo when putting.

In addition, it will be helpful for putting practice by measuring the speed of the putter 2 and the speed of the ball using an optical sensor, and providing additional information such as the characteristics of the putter 2 or whether or not the center portion A5 hits the ball through the relation between the measured speed of the putter 2 and speed of the golf ball.

Therefore, as the tempo, which is a key factor for determining a putting distance, is measured and fed back to a user by adding the third radiation unit 130 and the third light receiving unit 230 to a conventional device that provides only a putting distance and a putting direction, it will be helpful for improving putting skills by providing an effective practice method for a user to acquire a consistent tempo.

In addition, it will be helpful for hitting an accurate hitting point [the center portion A5 of the putter] by understanding the characteristics of a used putter and predicting a hitting point of the golf ball 1 through the speed relation of the golf ball 1 and the putter 2.

According to the present invention as described above, there is an effect of measuring a hitting speed and a tempo of a putter, which are key factors for determining a putting distance, and providing the speed and tempo to a user.

In addition, there is an effect of predicting a hitting point of a golf ball by measuring the speed of the golf ball and the speed of a putter and providing the hitting point to the user.

In addition, there is an effect that the user may adjust a force appropriately and form an accurate hitting point by performing practice based on the information provided about putting.

Although the present invention has been described in detail through specific embodiments, this is for describing the present invention in detail, and the present invention is not limited thereto, and it is apparent that modifications or improvements thereof can be made by those skilled in the art.

All simple modifications and changes of the present invention belong to the scope of the present invention, and the specific protection scope of the present invention will be clear by the appended claims.

What is claimed is:

1. A putting exerciser for evaluating a hitting speed and a tempo of a putter, the exerciser comprising:
    sensor installation units provided to be spaced apart from and face each other in a direction parallel to a traveling direction of a golf ball (1);
    a radiation unit (100) for radiating light or a light receiving unit (200) in a first sensor installation unit;
    a light receiving unit (200) or a radiation unit (100) in a second sensor installation unit;
    a speed detection unit (300) for detecting a speed of the golf ball (1) by checking a moment the golf ball passes when the golf ball (1) is putted as the light radiated from the radiation unit (100) is received by the light receiving unit (200);
    a position measurement unit (400) for measuring a position of the golf ball (1);
    an operation control unit (500) for performing calculation to detect an initial position value of the golf ball (1) measured by the position measurement unit (400) and a moving speed Vb and a moving distance Hb of the golf ball (1) measured through the speed detection unit (300); and
    a storage unit (600) for storing the measured speed Vb and distance Hb of the golf ball (1),
    wherein the radiation unit (100) includes:
        a first radiation unit (110) for radiating light to detect the initial position of the golf ball (1);
        a second radiation unit (120) for radiating light to detect the speed of the golf ball (1); and
        a third radiation unit (130) for radiating light to detect the hitting speed and tempo of the putter (2) moving behind the golf ball (1) to hit the golf ball (1),
    wherein the light receiving unit (200) includes:
        a first light receiving unit (210) installed to face the first radiation unit (110) to receive the light radiated from the first radiation unit (110);
        a second light receiving unit (220) installed to face the second radiation unit (120) to receive the light radiated from the second radiation unit (120); and
        a third light receiving unit (230) installed to face the third radiation unit (130) to receive the light radiated from the third radiation unit (130),
    wherein the third radiation unit (130) includes:
        a 31st radiation unit (131) installed to be close to the first radiation unit (110); and
        a 32nd radiation unit (132) installed at a location spaced apart from the 31st radiation unit (131) by a predetermined distance Dc,
    wherein the third light receiving (unit 230) includes:
        a 31st light receiving unit (231) installed to correspond to the 31st radiation unit (131); and
        a 32th light receiving unit (232) installed to correspond to the 32nd radiation unit (132),
    wherein when the time detected through the 31st radiation unit 131 and the 31st light receiving unit (231) after the putter (2) starts backswing is t0, and the time detected again through the 31st radiation unit (131) and the 31st light receiving unit (231) after the putter (2) is switched from backswing to downswing and moves forward is t1, the tempo T is defined as T=t1−t0,
    wherein when the time detected through the 32nd radiation unit (132) and the 32nd light receiving unit (232) after the putter (2) is switched to downswing and moves forward is t2, and the distance between the 31st radiation unit (131) and the 32nd radiation unit (132) is Dc, the speed Vp of the putter (2) is defined as Vp=Dc/(t1−t2).

2. The exerciser according to claim 1, wherein the tempo T measured by the backswing and downswing of the putter (2) and the speed Vp of the putter are stored in the storage unit (600) and after the putter (2) hits the golf ball (1), the moving speed Vb and the moving distance Hb of the golf ball (1) are calculated through the operation control unit (500) and then stored in the storage unit (600).

3. The exerciser according to claim 2, wherein after putting i times (i=1,2,3, . . . ,n−1,n) with the putter (2), a tempo Ti value measured each time is stored in the storage unit, and the operation control unit (500) calculates a standard deviation Tsd and an average Tav of the tempo Ti measured each time, and stores the calculated standard deviation Tsd and average Tav in the storage unit (600).

* * * * *